United States Patent [19]
Blomgren et al.

[11] Patent Number: 5,884,057
[45] Date of Patent: Mar. 16, 1999

[54] TEMPORAL RE-ALIGNMENT OF A FLOATING POINT PIPELINE TO AN INTEGER PIPELINE FOR EMULATION OF A LOAD-OPERATE ARCHITECTURE ON A LOAD/STORE PROCESSOR

[75] Inventors: James S. Blomgren, San Jose; Cheryl Senter Brashears, Cupertino, both of Calif.

[73] Assignee: Exponential Technology, Inc., San Jose, Calif.

[21] Appl. No.: 436,135

[22] Filed: May 8, 1995

Related U.S. Application Data

[63] Continuation-in-part of Ser. No. 361,017, Dec. 21, 1994, Pat. No. 5,542,059, which is a continuation of Ser. No. 180,023, Jan. 11, 1994, abandoned.

[51] Int. Cl.[6] .................................................. G06F 9/30
[52] U.S. Cl. .................. 395/375; 395/500; 395/800; 364/DIG. 1; 364/DIG. 2
[58] Field of Search ............................ 395/375, 500, 395/800, 650; 364/232.23

[56] References Cited

U.S. PATENT DOCUMENTS

| | | | |
|---|---|---|---|
| 4,992,934 | 2/1991 | Portanova et al. | 395/375 |
| 5,067,069 | 11/1991 | Fite et al. | 395/375 |
| 5,073,855 | 12/1991 | Staplin et al. | 395/375 |
| 5,136,696 | 8/1992 | Beckwith et al. | 395/375 |
| 5,150,468 | 9/1992 | Staplin et al. | 395/375 |
| 5,241,636 | 8/1993 | Kohn | 395/375 |
| 5,287,465 | 2/1994 | Kurosawa et al. | 275/375 |
| 5,481,684 | 1/1996 | Richter et al. | 395/375 |
| 5,481,693 | 1/1996 | Blomgren et al. | 395/375 |
| 5,542,059 | 7/1996 | Blomgren | 395/375 |
| 5,546,552 | 8/1996 | Coon et al. | 395/375 |

OTHER PUBLICATIONS

Combining Both Micro-Code and Hardwired Control in a RISC, Bandyopadhyay & Zheng, 1990, pp. 11–15.
A 5.6-MIPS Call-Handling Processor for Switching Systems, Hayashi et al., IEEE JSSC, Aug. 1989 pp. 945–950.
Combining RISC and CISC in PC Systems, Garth, Nov. 1991, pp. 10/1–10/5.

*Primary Examiner*—Robert B. Harrell
*Assistant Examiner*—Zarni Maung
*Attorney, Agent, or Firm*—Stuart T. Auvinen

[57] ABSTRACT

A processor that can execute both CISC and RISC instructions has an integer pipeline and a floating point pipeline. RISC instructions are sent to the floating point pipeline at the beginning of the integer pipeline, but CISC instructions re-align the floating point pipeline. CISC instructions are sent to the floating point pipeline near the end of the integer pipeline to allow the integer pipeline to fetch memory operands for the floating point pipeline. Thus the floating point pipeline relies on the memory operand fetch facilities of the integer pipeline. Complex CISC fetch-operate instructions pass through the integer pipeline first to fetch a floating point operand, and then begin the floating point pipeline for execution of a floating point operation. However, RISC instructions only use register operands and can begin the floating point pipeline earlier, reducing latency until the floating point result is produced. Rapid re-configuration of the pipeline alignment between a pipeline optimized for RISC instructions and one optimized for CISC instructions is possible with muxes and a mode register. Exception handling and pipeline coordination are also described.

14 Claims, 6 Drawing Sheets

Fig. 1

| Clocks | 1 | 2 | 3 | 4 | 5 | 6 | 7 | 8 | 9 |
|---|---|---|---|---|---|---|---|---|---|
| Integer Pipeline | D | A | C | M | W | | | | |
| Floating Point Pipeline | F0 | F1 | F2 | F3 | F4 | F5 | | | |

Fig. 2

| Clocks | 1 | 2 | 3 | 4 | 5 | 6 | 7 | 8 | 9 |
|---|---|---|---|---|---|---|---|---|---|
| Integer Pipeline | D | A | C | M | W | | | | |
| Floating Point Pipeline | | | | F0 | F1 | F2 | F3 | F4 | F5 |

| Floating Point Stage | F0 | F1 | F2 | F3 | F4 | F5 |
|---|---|---|---|---|---|---|
| Integer Stage | | | | | | |
| D | 1 | | | | | |
| A | | 2 | 3 | 4 | 5 | |
| C | | 3 | 3/* | * | * | |
| M | | 4 | * | 4/* | * | |
| W | | | | * | 5/* | * |
| +1 | | | | | * | 6/* |
| +2 | | | | | | 7/* |

Fig. 7

TEMPORAL RE-ALIGNMENT OF A FLOATING POINT PIPELINE TO AN INTEGER PIPELINE FOR EMULATION OF A LOAD-OPERATE ARCHITECTURE ON A LOAD/STORE PROCESSOR

RELATED APPLICATIONS

This is a continuation-in-part of "Pipeline with Temporal Re-Arrangement of Functional Units for Dual-Instruction Set CPU", Ser. No. 08/361,017, filed Dec. 21, 1994 now U.S. Pat. No. 5,542,059, which is a continuation of Ser. No. 08/180,023, filed Jun. 11, 1994 abandoned. All applications have a common inventor and are assigned to the same assignee.

BACKGROUND OF THE INVENTION

1. Field of the Invention

This invention relates to computer processors, and more particularly to the realignment of a floating point pipeline to an integer pipeline.

2. Description of the Related Art

Pipelined microprocessors are well-known. These processors have a main pipeline or pipelines for executing standard integer operations. However, floating point operations are so complex that the integer pipelines are not able to efficiently process these floating point operations. A separate floating point unit (FPU) such as a co-processor has been used to efficiently process these floating point operations. More recently, the FPU has been integrated onto the microprocessor chip. Thus the FPU, which is itself pipelined, acts as an additional pipeline in the microprocessor.

Dual-Instruction-Set Processor for RISC and CISC

A new type of microprocessor has been invented that can process instructions from two different instruction sets. For example, a complex instruction set computer (CISC) instruction set may be processed on a reduced instruction set computer (RISC) microprocessor, as described in "Dual-Instruction-Set Architecture CPU with Hidden Software Emulation Mode", U.S. application Ser. No. 08/179,926, assigned to this application's assignee. In this dual-instruction-set processor, the second CISC instruction set is not merely emulated in software, but many of the simpler CISC instructions are directly executed in the RISC pipeline. The more complex CISC instructions are emulated by routines of RISC instructions.

This dual-instruction-set processor had a problem that was addressed in the parent application, "Pipeline with Temporal Re-Arrangement of Functional Units for Dual-Instruction Set CPU", U.S. application Ser. No. 08/361,017. The problem was that CISC instructions use memory operands while RISC instructions use only register operands. Thus for RISC operations, the pipeline is most efficient when the memory access stages of the pipeline are located late in the pipeline, such as in the execute stage. However, for CISC operations the memory access stages must be located early in the pipeline, before the execute stage so they can deliver a memory operand to the execute stage.

Efficient Dual-Pipeline Moves Execute Hardware to Different Stages

The solution to the problem of pipeline efficiency was to allow the execute hardware to "move" in the time and sequence of the pipestages to an earlier stage for RISC operations, but move to later stages for CISC operations. Thus the pipeline for CISC was arranged:

D A C M/X W but for RISC was re-arranged to:

D A/X C M W where D is the decode stage, A the address generate stage, C the cache access stage, M the memory access stage, and W the write-back stage. X is the execution hardware such as the arithmetic-logic-unit (ALU). The execution hardware appears in the 4th (M) stage for CISC, allowing a memory operand to be fetched from the cache before the ALU. The pipeline is re-arranged for RISC to use the ALU in the 2nd (A) stage. Thus the RISC pipeline arrangement has reduced latency until the execute occurs, which improves performance.

Floating Point Instructions

Floating point instructions also differ with the RISC and CISC instruction sets. RISC floating point instructions use register operands, while CISC floating point instructions first fetch an operand from memory before the operation is performed. Thus the basic pipeline for RISC and CISC floating point instructions also differ in requirements. A simple execute or load-only pipeline works best with RISC, but CISC requires a more complex load-first-then-execute pipeline.

However, the floating point pipeline does not contain load/store hardware. Thus the integer pipelines must be used for load and store operations. While this is not a problem for RISC instructions, since the load operations do not also use the floating point pipeline, CISC instructions must use both the load/store integer pipeline and then the floating point pipeline. Coordination between the integer and floating point pipelines is critical.

What is desired is a processor having a floating point pipeline coordinated with integer pipelines. It is desired to execute both CISC and RISC floating point instructions in the floating point pipeline, but without adding memory fetch stages or hardware to the floating point pipeline.

SUMMARY OF THE INVENTION

A dual-instruction-set processor can process integer and floating point instructions from a first instruction set and from a second instruction set. The processor has an integer pipeline for processing integer instructions from the first instruction set and from the second instruction set. The integer pipeline has a decode stage for decoding integer and floating point instructions from the first instruction set and from the second instruction set. A memory-operand fetch stage retrieves an operand from a memory. The operand is in an integer format or a floating point format.

A floating point pipeline processes floating point instructions from the first instruction set and floating point instructions from the second instruction set. A re-alignment means couples the integer pipeline to the floating point pipeline. It has a first means that couples the decode stage of the integer pipeline to a beginning of the floating point pipeline when a first instruction in the first instruction set is processed by the floating point pipeline. A second means couples the memory-operand fetch stage of the integer pipeline to the beginning of the floating point pipeline when a second instruction in the second instruction set is processed by the floating point pipeline. Thus the floating point pipeline is re-aligned to the integer pipeline when the second instruction in the second instruction set is processed by the floating point pipeline.

In further aspects a mode register means is coupled to the re-alignment means. The mode register means indicates when the first instruction set is processed by the floating point pipeline and when the second instruction set is processed by the floating point pipeline. The decode stage of the integer pipeline has a first instruction decode means for decoding instructions from the first instruction set and a second instruction decode means for decoding instructions from the second instruction set. The integer pipeline has a select means coupled to the first instruction decode means and the second instruction decode means. A decoded instruction from the first instruction decode means is selected for processing by the integer pipeline when the mode register means indicates that the first instruction set is processed. However, a decoded instruction from the second instruction decode means is selected for processing by the integer pipeline when the mode register means indicates that the second instruction set is processed. The first instruction set is a RISC instruction set and the second instruction set is a CISC instruction set. The CISC instruction set includes floating point load-operate instructions but the RISC instruction set does not include load-operate instructions.

In still further aspects a method coordinates a floating point pipeline loosely coupled to an integer pipeline. The integer pipeline has a decode stage and a write-back stage and a stage before the write-back stage. A floating point instruction is decoded and dispatched to an integer pipeline and to a floating point pipeline. A valid decode signal is sent from the integer pipeline to the floating point pipeline when a valid floating point instruction is decoded. The valid decode signal cancels the floating point instruction in the floating point pipeline when the instruction decoded is not a valid floating point instruction.

The floating point instruction is processed in the floating point pipeline and in the integer pipeline. If a floating point exception is possible in an intermediate stage in the floating point pipeline, then an exception possible signal is sent from the intermediate stage in the floating point pipeline to the stage before the write-back stage in the integer pipeline. The integer pipeline is held in the stage before the write-back stage when the exception possible signal indicates that the floating point exception is possible. The integer pipeline is released to the write-back stage when the exception possible signal indicates that the floating point exception is not possible. An integer or condition-code register is written in the write-back stage. A completion signal from the write-back stage of the integer pipeline is sent to the floating point pipeline when the floating point instruction is in the write-back stage.

The floating point pipeline is blocked from completing when the completion signal indicates that the floating point instruction is not yet in the write-back stage. The floating point pipeline is allowed to complete processing when the completion signal indicates that the floating point instruction is in the write-back stage. Thus the floating point pipeline is loosely controlled by the valid decode signal and the completion signal from the integer pipeline, and the integer pipeline is released to the write-back stage when no possible floating point exception is signaled from the floating point pipeline.

In other aspects the floating point pipeline is re-aligned to a later stage after the decode stage but before the write-back stage of the integer pipeline when a CISC load-execute floating point instruction is processed.

DETAILED DESCRIPTION

The present invention relates to an improvement in floating point processors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Basic Concept

The entire floating point pipeline may be thought of a single piece of hardware that is temporally "moved" as the integer pipeline is re-arranged for a different instruction set. It is "moved" by being re-located to a different pipeline stage or pipestage, so that the floating point pipeline occurs at a different stage at a different time relative to the beginning of the integer pipeline. Thus the floating point pipeline could begin early in the integer pipeline for RISC execute-only instructions, but later in the integer pipeline after the memory access stages for CISC load-operate instructions.

While this concept is useful for a basic understanding of the invention, the floating point pipeline is itself several stages long. Thus it is not simply a "single piece of hardware" that can be located in a single stage of the main integer pipeline. The floating point pipeline is re-aligned to the integer pipeline rather than simply re-arranged within the integer pipeline. Additional considerations in coordinating the two pipelines are described below.

Figure 1:
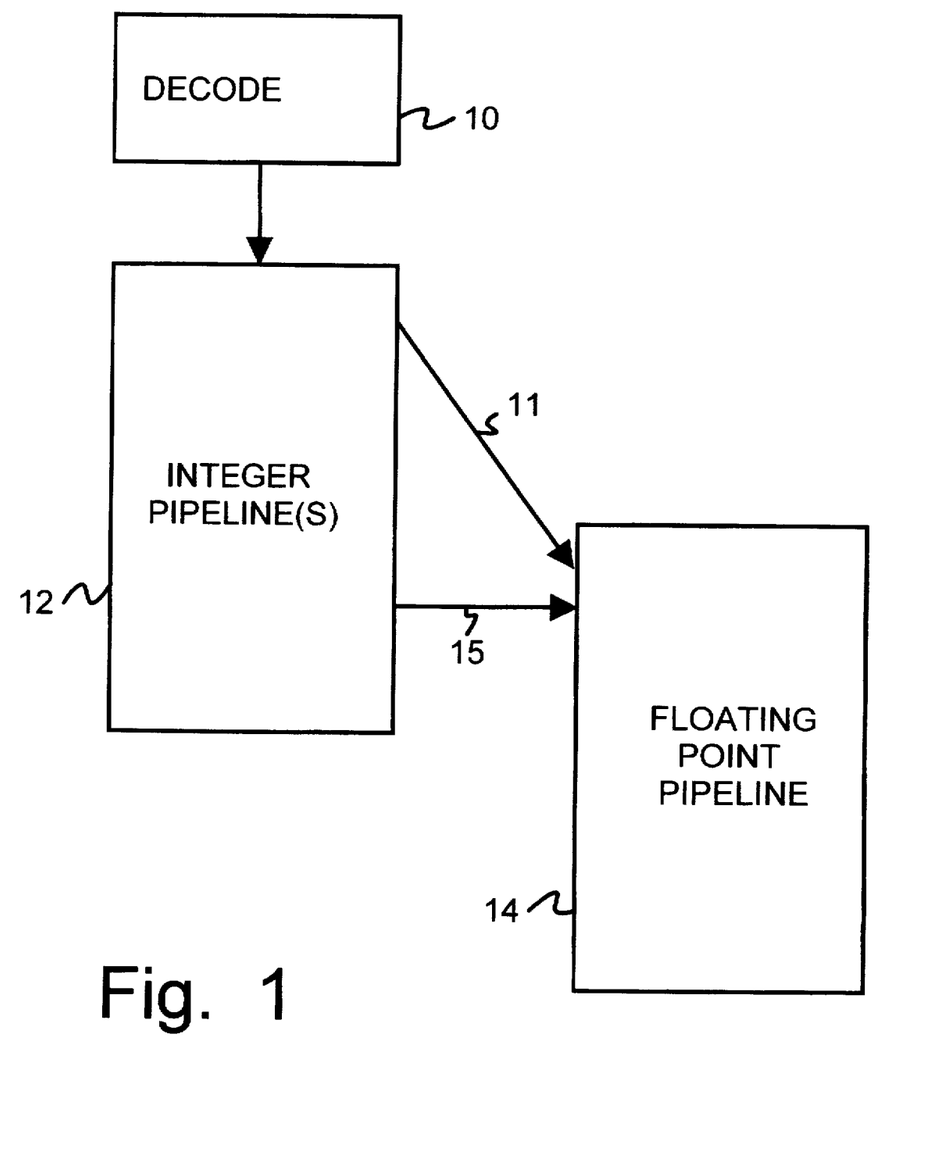
FIG. 1 is a diagram of a processor with an integer pipeline and a floating point pipeline that is temporally re-aligned.

FIG. 1 is a diagram of a processor with an integer pipeline and a floating point pipeline that is temporally re-aligned. Decode unit 10 receives one or more instruction words from an instruction fetcher (not shown). Decode unit 10 may be considered a first stage of the pipeline, or it may load decoded instructions into D-stage registers in integer pipeline 12. Integer pipeline 12 may receive just one decoded instruction from decode unit 10 for any clock cycle, or integer pipeline 12 may include several individual pipelines which receive several decoded instructions from decode unit 10 each clock cycle.

Integer pipelines 12 include address generation and memory or cache access facilities, and an arithmetic-logic-unit (ALU) for integer operands. Floating point operands require specialized floating point hardware which is located in floating point pipeline 14. Complex floating point operations can be processed over several stages in floating point pipeline 14, which may need to have more stages than integer pipeline 12.

Floating point instructions are first processed by integer pipeline 12 and then passed on to floating point pipeline 14. This allows the address generation and memory access facilities of integer pipeline 12 to be used to fetch floating point operands from memory before the instruction is passed to floating point pipeline 14 for performing the floating point operation. Thus fetch-operate instructions use integer pipeline 12 to fetch the operand, but floating point pipeline 14 to perform other floating point operations. These fetch-operate instructions are common for CISC instructions. However, RISC instructions use register operands rather than memory operands, so RISC instructions do not need to use the memory access facilities of integer pipeline 12 before floating point pipeline begins operation on an instruction.

FIG. 1 shows two connecting lines 11, 15 from integer pipeline 12 to floating point pipeline 14. The upper connecting line 11 connects an early stage in integer pipeline 12 to floating point pipeline 14. Upper connecting line 11 is used for simple RISC floating point instructions that operate on register operands. However, lower connecting line 15 connects a later stage in integer pipeline 12 to floating point pipeline 14. The later stage is after the address generate and memory access stages of integer pipeline 12, allowing a memory operand to be fetched before floating point pipeline 14 begins to operate on the memory operand. Lower connecting line 15 is useful for complex CISC fetch-operate floating point instructions because integer pipeline 12 fetches the memory operand before passing control to floating point pipeline 14.

Alignment of Integer & Floating-Point Pipelines—RISC

Figure 2:
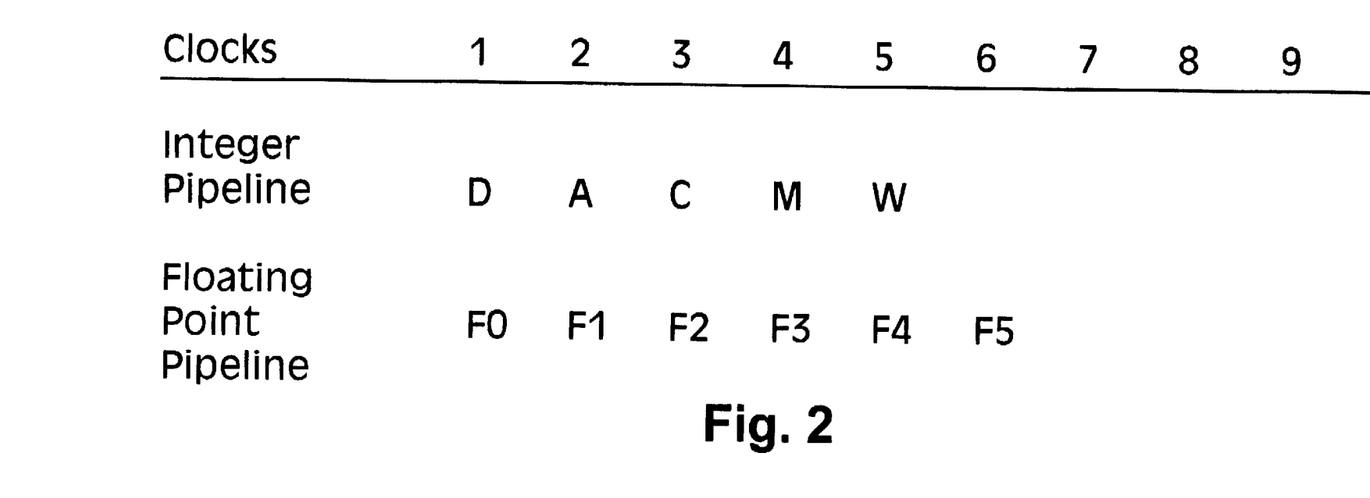
FIG. 2 is a pipeline diagram for a RISC-aligned floating point pipeline.

FIG. 2 is a pipeline diagram for a RISC-aligned floating point pipeline. Integer pipeline 12 has stages D, A, C, M, and W. Instructions are decoded or latched from decode unit 10 during the D stage. During the next (2nd) clock cycle without stalls, a memory address may be generated during the A stage. A cache is accessed during stage C in the third clock period, while the cache data is returned or an external memory access begins in memory stage M in clock 4. External main-memory accesses may require many additional clock cycles, stalling the pipeline in the M stage. However, a cache hit returns a data operand in stage M, and in write-back stage W this operand is written to a register. For execute instructions with integer operands, an ALU produces a result in stage M, or an earlier stage (A, C) if register operands are used.

Floating point pipeline 14 contains six stages F0 to F5. Floating point registers are read for operands in stage F0 and state machines are setup as required by the requested operation. Pre-calculation steps such as pre-normalization of one of the operands for addition occurs in stage F1. The multiply or part of it may also occur in F1. The floating point calculation such as add or multiply occurs in stage F2. In F3, the result is post-normalized. While in stage F4 the result is rounded by an incrementer and the exponent is calculated based on the amount of normalization. The result is written back to floating point register in stage F5.

Stage F1 stalls for one additional cycle if it is performing a double-precision multiply, and stage F1 stalls for many cycles if a de-normalized operand is supplied to certain of the operand inputs. The F4 stage can also stall if a de-normalized result is being delivered.

Integer pipeline 12 is aligned to floating point pipeline 14 as shown in FIG. 2 for RISC instructions. Since memory operands are not used for RISC instructions, the floating point operation can begin early, reducing the latency until the result is available.

Floating point pipeline 14 begins with stage F0 aligned to integer pipeline stage D. Timing is critical, since the instruction must be decoded and the floating point registers accessed within one clock period. However, RISC instructions are easier to decode than CISC instructions, since fields in the RISC instruction word containing specifiers for register operands are in a fixed position within the instruction word, allowing the register specifier to be extracted from the instruction word in parallel with the instruction decode. The floating point registers may also be accessed in parallel with the instruction decode. If the instruction decode determines that the register access was in error, such as when the instruction was not a floating point instruction, or an operand was not needed, then the register operand accessed in parallel can simply be thrown away or not latched. Thus the timing, while aggressive, is possible.

When no pipeline stalls occur, the stages are aligned D-F0, A-F1, C-F2, M-F3, and W-F4, with F5 occurring after the W stage. The integer pipeline completes one clock before the floating point pipeline.

Alignment of Integer & Floating-Point Pipelines—CISC

Figure 3:
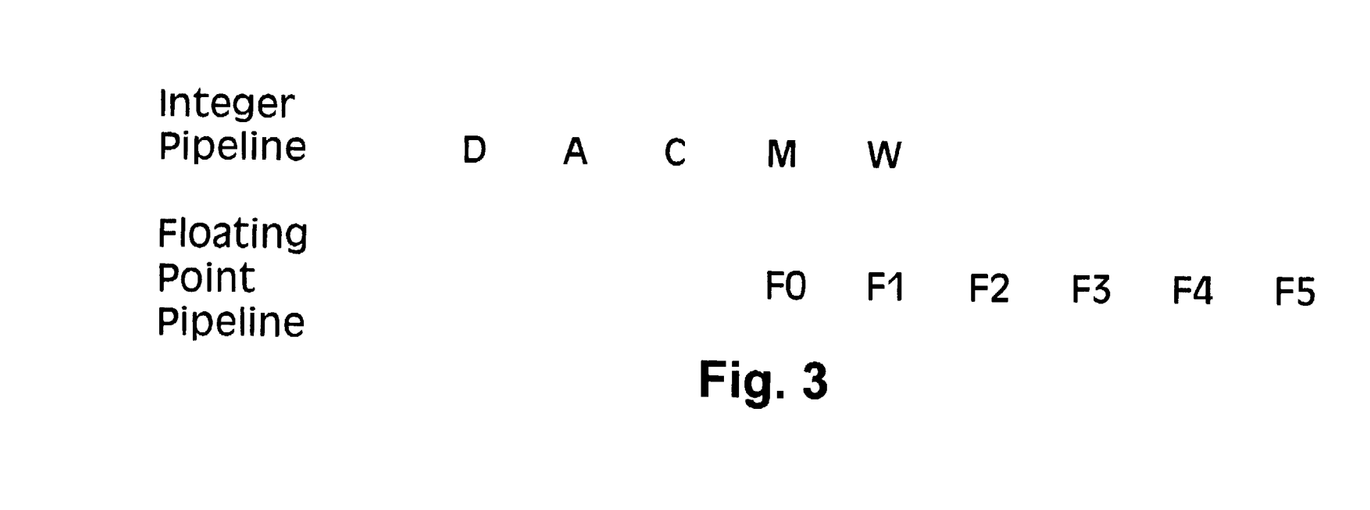
FIG. 3 is a pipeline diagram for a CISC-aligned floating point pipeline.

FIG. 3 is a pipeline diagram for a CISC-aligned floating point pipeline. CISC instructions may fetch an operand from memory or the cache before performing the floating point operation. Thus floating point pipeline 14 does not begin until stage M of integer pipeline 12. Integer pipeline 12 stage M is aligned with floating point pipeline 14 stage F0. The final integer pipeline 12 stage, W, normally occurs when floating point pipeline 14 is in its second stage, F1. While integer pipeline 12 completes with stage W in clock 5, floating point pipeline 14 continues through stages F2, F3, F4, and F5 in the next four clock periods.

Thus floating point pipeline 14 is aligned three stages and three clock periods later to integer pipeline 12 for CISC instructions than for RISC instructions. RISC instructions can produce their results as quickly as possible, while CISC instructions are delayed to allow fetching memory operands before the floating point operation is executed.

DETAILED DIAGRAM OF RE-ALIGNABLE PROCESSOR

Figure 4:
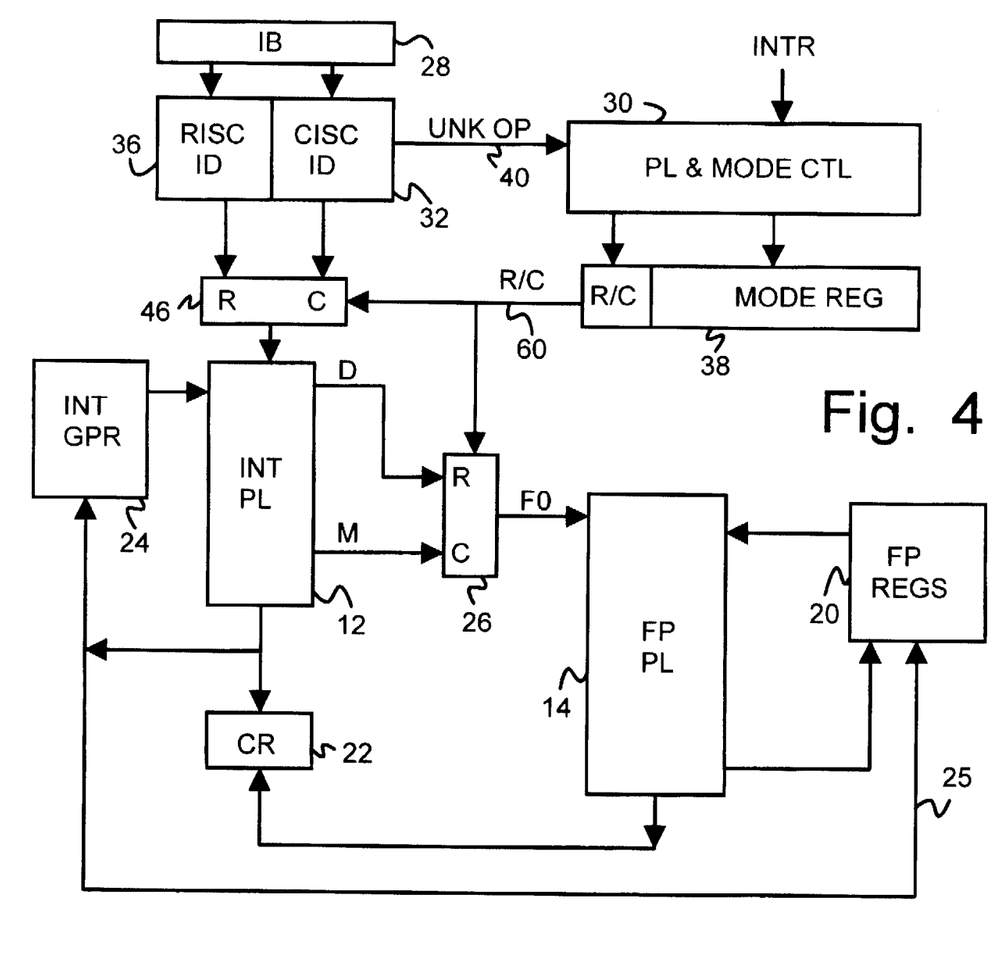
FIG. 4 is a detailed diagram of the dual-instruction set processor with a temporally re-aligned floating point pipeline.

FIG. 4 is a detailed diagram of the dual-instruction set processor with a temporally re-aligned floating point pipeline.

The RISC and CISC instruction sets have independent encoding of instructions to opcodes. While both sets have ADD operations, the opcode number which encodes the ADD operation is different for the two instruction sets. In fact, the size and location of the opcode field in the instruction word is also different for the two instruction sets. Thus two instruction decoders are used for the two instruction sets—a RISC decoder 36 and a CISC decoder 32.

Mode register 38 contains a bit to indicate the current mode or instruction set being processed. This RISC/CISC mode bit is supplied to instruction decoders 32, 36 along signal 60. Mux 46 receives RISC/CISC mode signal 60 on its select input, and selects either the output from RISC decoder 36 if set to one or the output from CISC decoder 32 if logically zero or cleared. Instruction buffer 28 receives one or more instruction words from an instruction fetcher (not shown) and sends instruction bytes simultaneously to RISC decoder 36 and CISC decoder 32.

CISC to RISC Mode Switching

Switching between RISC and CISC modes is under the control of pipeline and mode control logic 30. Mode logic 30 sets or clears the RISC/CISC bit 60 in mode register 38 to reconfigure the pipeline alignment using mux 26. In addition, mode bit 60 enables the output from one of the two instruction decoders using mux 46. In a preferred embodiment, certain very complex CISC instructions are not directly supported in hardware but are emulated by software routines composed of simpler RISC instructions. CISC instruction decoder 32 detects these emulated instructions and signal an unknown opcode over line 40 to mode control logic 30. Mode control logic 30 then sets the RISC bit 60 in register 38 and load the instruction pointer (not shown) with the address of the emulation routine in memory. The RISC emulation routine executes, and performs the operation that the very complex CISC instruction would have performed. The last instruction of the emulation routine is a special extended RISC instruction causing the mode register 38 to be reset to CISC mode and the instruction pointer updated to point to the following CISC instruction. The CISC program continues with the following instruction unaware that the instruction was emulated with RISC instructions.

Switching from CISC mode to RISC mode may also occur when an interrupt or exception is signaled to the mode logic 30. Events such as divide-by-zero and adder overflows may cause the mode switch to occur. If paging is provided with a translationlookaside buffer (TLB) on the CPU die, then TLB misses or page faults can also cause the mode switch, allowing the TLB to be loaded only by the RISC mode.

Thus both CISC and RISC instructions may be processed during execution of the same program, and the pipeline must efficiently execute both RISC and CISC instructions. Rapid re-configuration of the pipeline alignment between a pipeline optimized for RISC instructions and one optimized for CISC instructions is possible with muxes 26, 46 and mode register 38.

Switching from CISC to RISC alignment requires that the floating point pipeline be realigned from the M back to the D stage. Any CISC floating point instructions in the intervening A, C, or M stages stall the re-alignment of the floating point pipeline, since they dispatch a CISC floating point instruction to the floating point pipeline when they reach the M stage, before the RISC instruction in the D stage may send its floating point instruction to the floating point pipeline. However, it is unlikely that a CISC floating point instruction will be in the intervening A, C, or M stages when a switch to RISC mode occurs.

Mux 46 outputs a decoded RISC or CISC instruction to integer pipeline 12, which may have several pipelines for superscalar execution. Integer pipeline 12 reads register operands from integer general-purpose registers (GPR's) 24 during an early pipeline stage such as the D stage. Integer instructions may write their result back to GPR's 24 during the last write-back W stage of integer pipeline 12. Condition register 22 may also be written during the W stage if condition codes are updated.

Since integer pipeline 12 contains cache and memory access facilities while floating point pipeline 14 does not, memory operands in floating point format must be fetched by integer pipeline 12 and loaded into floating point registers 20. An additional port 25 into floating point registers 20 is provided from integer pipeline 12 for memory operand loads and stores.

RISC instructions that load or store floating point operands use integer pipeline 12, but read or write the floating point registers 20 rather than the integer general-purpose registers (GPR's) 24. Floating point pipeline 14 reads these floating point registers 20 during the F0 stage for register operands, and writes the result of the floating point operation back to floating point registers 20 during the last F5 stage. Condition register 22 may also be written by floating point pipeline 14. In particular, floating point condition bits from compare operations may be written to condition register 22, which may contain the RISC PowerPC™ CR and FPSCR status registers.

Floating point pipeline 14 is aligned to integer pipeline 12 for RISC and CISC modes by mux 26. When RISC/CISC mode signal 60 is high, indicating RISC mode, stage F0 of floating point pipeline 14 receives the floating point portion of the decoded RISC instruction from stage D of integer pipeline 12. However, when RISC/CISC mode signal 60 is low, indicating CISC mode, stage F0 of floating point pipeline 14 receives the floating point portion of the decoded CISC instruction from stage M of integer pipeline 12. Staging registers may be used so that stage C, just before stage M, sends the decoded CISC instruction to stage F0 in the next clock edge.

PIPELINE COORDINATION—RISC

Figure 5:
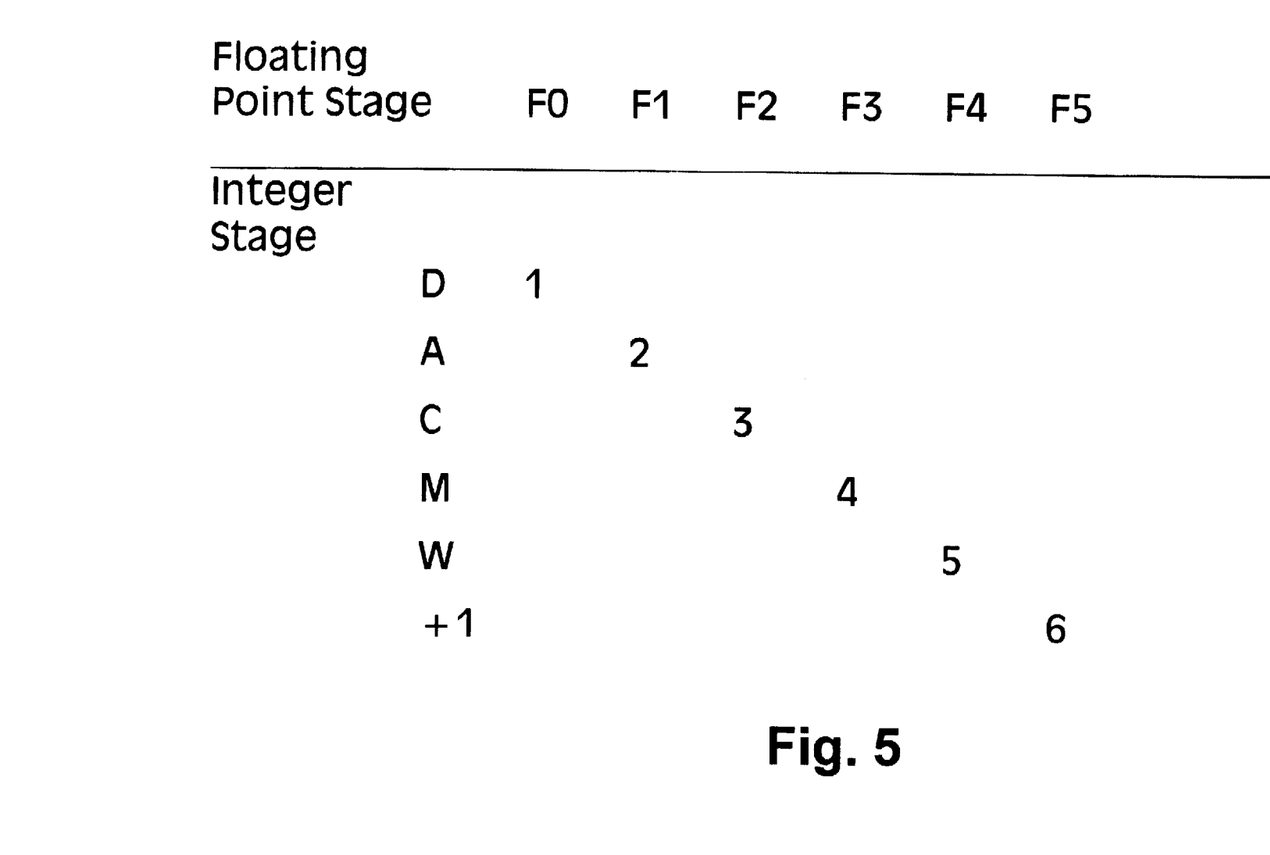
FIG. 5 is a matrix of the stages for an integer and floating point pipeline where the integer pipeline stages are rigidly bound to floating point stages.

The integer and floating point pipelines could be restricted to always being in exact alignment with corresponding stages. For RISC mode, integer pipeline stage D could only occur with floating point pipeline stage F0, stage A with stage F1, stage C with F2, M with F3, W with F4. Thus one pipeline could never get ahead of the other, and both pipelines would have to stall when one pipeline stalled. FIG. 5 is a matrix of the stages for an integer and floating point pipeline where the integer pipeline stages are rigidly bound to floating point stages. For clock 1, stages D and F0 are bound, while stages A and F1 are bound for clock 2, with other bindings for stages C, M, W to stages F2, F3, and F4. If any stage stalls, such as stage M, then both pipelines must stall. Thus the floating point pipeline must remain in stage F3 when integer stage M stalls.

Figure 6:
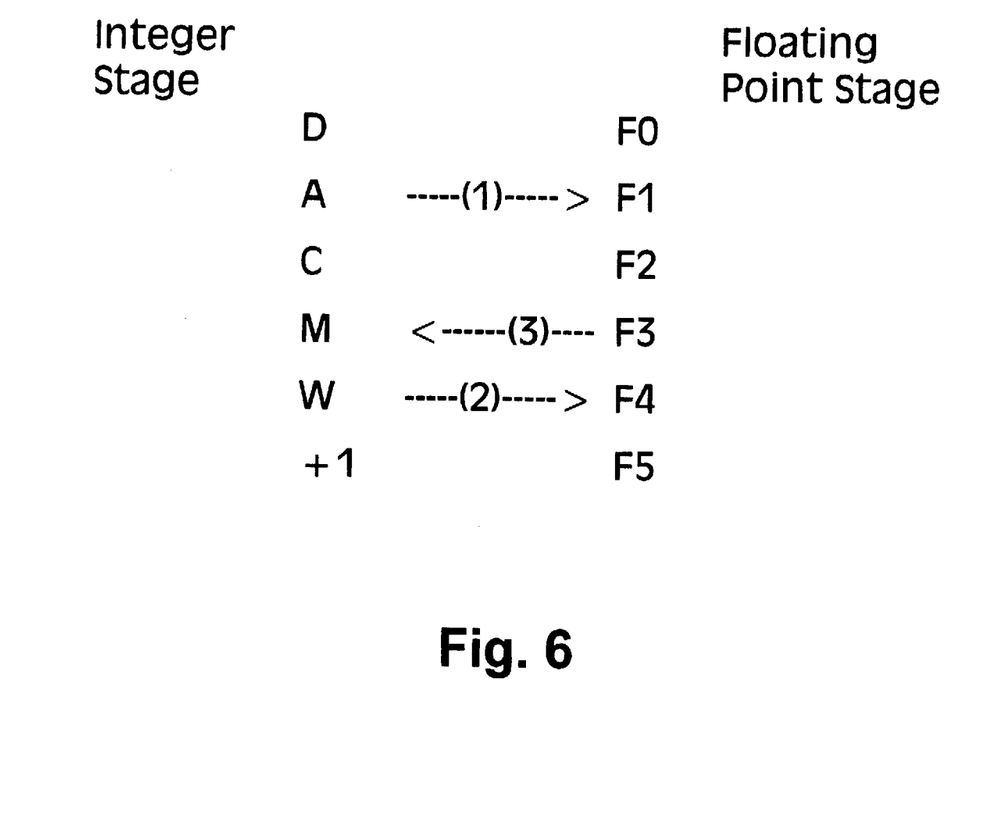
FIG. 6 is a diagram illustrating a loose coupling between an integer pipeline and a floating point pipeline.

The two pipelines do not need to be so rigidly coupled. However, some coupling is useful. FIG. 6 is a diagram illustrating a loose coupling between an integer pipeline and a floating point pipeline. The integer pipeline sends two signals labeled (1) and (2) in FIG. 6 to the floating point pipeline:

(1) Integer pipeline stage A sends a start signal to floating point stage F1 indicating that the floating point pipeline can begin its operation and proceed to stage F4 without concern for the integer pipeline.

(2) Integer pipeline stage W sends a completion signal to floating point stage F4, indicating that the integer pipeline has completed and the floating point pipeline may also complete and safely write its results to the floating point register. Likewise the floating point pipeline sends a signal to the integer pipeline:

(3) Floating point stage F3 sends a "no exception" signal to integer stage M, indicating that no floating point exception has occurred in the floating point pipeline. Thus the integer pipeline can move to stage W and complete.

Exception signal (3) stalls the integer pipeline in stage M when a floating point exception is possible. This prevents the integer pipeline from moving to stage W and completing when an exception could still occur. If the floating point pipeline has not yet reached stage F3 an thus the exception signal (3) has not been sent to stage M, then the integer pipeline must stall until the floating point pipeline reaches stage F3 and exception signal (3) is received.

Figure 7:
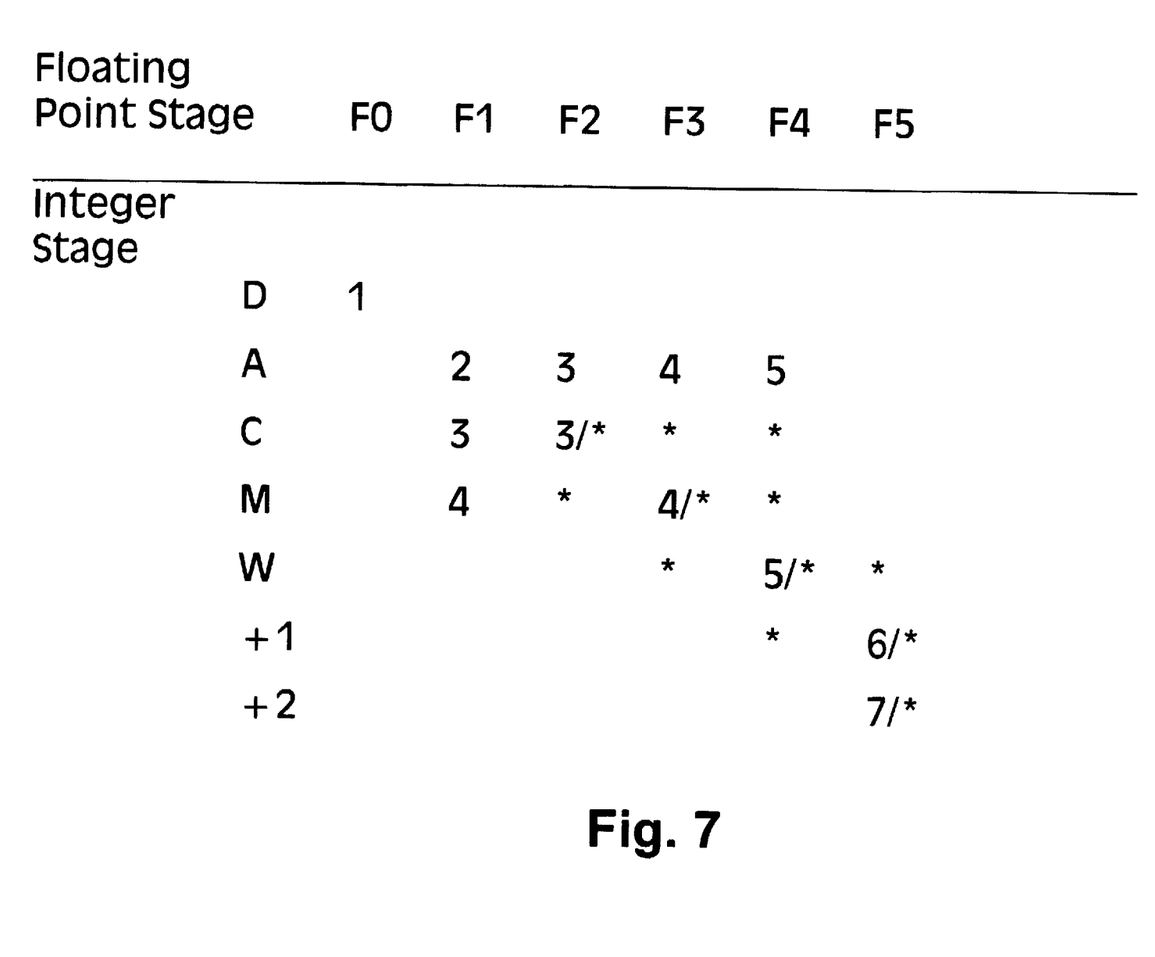
FIG. 7 is a matrix of pipestages for an integer and floating point pipeline where the integer pipeline stages are loosely bound to floating point stages.

FIG. 7 is a matrix of pipestages for an integer and floating point pipeline where the integer pipeline stages are loosely bound to floating point stages. Integer and floating point stages can only be paired together as shown in FIG. 7. Thus stages D and F2 can never occur together, but stage F2 can occur with stages A, C, or M. The numbers in FIG. 7 are possible clock sequences, while asterisks indicate that several clock sequences pass through that point in the matrix.

For clock 1, stages D and F0 are bound, having been dispatched together. The same instruction is dispatched to both the integer and the floating point pipeline. This allows the floating point pipeline to use the integer pipeline's control logic. Both pipelines normally proceed to stages A and F1 for clock 2. Start signal (1) is sent from stage A to stage F1, allowing the floating point pipeline to proceed to stage F4. If the integer pipeline stalls for several clocks in stage A, then the floating point pipeline proceeds through stages F2, F3, and F4 on clocks 3, 4, 5, a horizontal sequence in FIG. 7. The floating point pipeline at clock 5 must then wait in stage F4 until the integer pipeline passes through stages C and M, when finish signal (2) is sent to the floating point stage F4. During stage F3 the exception signal (3) was sent to the integer pipeline, even though it was not yet in stage M. This exception signal (3) must be latched or queued until the instruction reaches stage M. Thus a vertical sequence in FIG. 7 correspond to stalls in the floating point pipeline, while horizontal sequences correspond to stalls in the integer pipeline. Diagonal sequences are the most efficient, since they represent sequences when neither pipeline stall.

PIPELINE COORDINATION—CISC

Since the floating point pipeline is aligned to a later stage in the integer pipeline, coordination is simpler in some respects. The floating point pipeline does not begin until stage M of the integer pipeline. If any possibility exists for an exception in an older instruction in the floating point pipeline, then the next floating point instruction must stall in the M, F0 stages until the older instructions complete, or are able to definitely indicate that no exception will occur.

Since x86 CISC instructions report exceptions on the following floating point instruction, the current floating point instruction is always allowed to complete. Thus when the integer pipeline proceeds to the W stage, the floating point pipeline may continue on to the end of the floating point pipeline. The next floating point instruction has to stall when a prior floating point instruction is still in the floating point pipeline. Of course, when exceptions are disabled or predicted the stalls can be avoided.

The preferred embodiment only supports precise exceptions, those which are reported immediately after a floating point instruction which encounters the exception and before any other instructions of any kind are allowed to execute. Another common approach is called imprecise exceptions. Imprecise exceptions cost more in hardware since they must save instruction pointers and other information to allow an operating system to back-up a program to the point of failure.

The size of the floating point register set can impact performance. RISC typically provides 32 floating point registers while x86 CISC provides only 8. RISC compilers can schedule the loading of floating point registers ahead of their use, avoiding load-use stalls. However, the smaller number of registers for CISC can add load stalls since a floating point-intensive program may simply run out of free registers. Thus in RISC mode the floating point pipeline may be directly aligned to the integer pipeline without load-use stalls due to the ability of the compilers to use the larger number of registers.

ADVANTAGES OF LOOSE PIPELINE COUPLING

The loose coupling of the pipelines has several advantages. Double-precision multiply operations require two clock cycles in the F1 stage, introducing a pipeline stall. This stall in the floating point pipeline will not stall the loosely-coupled integer pipeline as it would for a rigidly-coupled integer pipeline. The integer pipeline is stalled if two floating point double-precision multiply instructions occurred back-to-back, but this is not common. Thus the extra stall in the floating point pipeline is hidden from the main integer pipeline, increasing performance.

Rigidly-coupled pipelines require many interlock signals between the two pipelines; at least one interlock signal for each stage. These signals are speed-critical, which might force the floating point pipeline to be placed in close proximity to the integer pipeline. This may not be feasible on some layouts. Thus the floating point pipeline can act as a more independent unit on the CPU die.

ALTERNATE EMBODIMENTS

Several other embodiments are contemplated by the inventors. If the integer pipeline is allowed to contain both RISC and CISC instructions at the same time, then the RISC/CISC mode bit must be staged down the integer pipeline so that mux 26 aligns the floating point pipeline to the integer pipeline properly. Staging values from registers is well-known in the art.

This improvement relates to a central processing unit (CPU) with a dual-instruction set architecture. While the detailed description describes the invention in the context of a reduced instruction set computer (RISC) and a complex instruction set computer (CISC), it is contemplated that the invention applies to other instruction sets besides RISC and CISC, and to more than two instruction sets, without departing from the spirit of the invention.

A certain type of CISC floating point instruction, with an integer memory operand, must first be converted to floating point format before the operation. Two separate flows through the floating point pipeline are used. The operand is retrieved from memory by the integer pipeline. Then in the first flow through the floating point pipeline the integer operand is converted to floating point format. In the second flow through the floating point pipeline the converted operand is used in the floating point operation. The floating point format typically includes a mantissa or significand portion and an exponent portion, while the integer format does not include an exponent portion.

Exception prediction may also be used, with a modification to the exception signal from the floating point pipeline to the integer pipeline. Some exceptions are known early, such as divide by zero and invalid opcode and can thus be easily predicted.

Floating point stage F3 has been described as sending a "no exception" signal to integer stage M, indicating that no floating point exception has occurred in the floating point pipeline. However, some floating point instructions may not report an exception until the F4 stage. For these floating point instructions, the "no exception" signal is sent from stage F4 to stage M, rather than from stage F3. This can stall the integer pipeline for an extra cycle. These late-exception instructions are relatively rare.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dual-instruction-set processor for processing integer and floating point instructions from a first instruction set and from a second instruction set, the processor comprising:

an integer pipeline for processing integer instructions from the first instruction set and for processing integer instructions from the second instruction set, the integer pipeline comprising:

a decode stage for decoding integer and floating point instructions from the first instruction set and from the second instruction set; and a memory-operand fetch stage for retrieving an operand from a memory, the operand being in an integer format or a floating point format;

a floating point pipeline for processing floating point instructions from the first instruction set and for processing floating point instructions from the second instruction set; and re-alignment means for coupling the integer pipeline to the floating point pipeline, comprising:

first means for coupling the decode stage of the integer pipeline to a beginning of the floating point pipeline when a first instruction in the first instruction set is processed by the floating point pipeline; and second means for coupling the memory-operand fetch stage of the integer pipeline to the beginning of the floating point pipeline when a second instruction in the second instruction set is processed by the floating point pipeline;

wherein the floating point pipeline is re-aligned to the integer pipeline when the second instruction in the second instruction set is processed by the floating point pipeline.

2. The processor of claim 1 wherein the memory is a main memory external to the processor.

3. The processor of claim 1 wherein the memory is a cache memory within the processor.

4. The processor of claim 1 further comprising:

mode register means, coupled to the re-alignment means, for indicating when the first instruction set is processed by the floating point pipeline and when the second instruction set is processed by the floating point pipeline.

5. The processor of claim 4 wherein the decode stage of the integer pipeline comprises:

first instruction decode means for decoding instructions from the first instruction set; and second instruction decode means for decoding instructions from the second instruction set.

6. The processor of claim 4 wherein the integer pipeline further comprises:

select means, coupled to the first instruction decode means and the second instruction decode means, for selecting a decoded instruction from the first instruction decode means for processing by the integer pipeline when the mode register means indicates that the first instruction set is processed, but selecting a decoded instruction from the second instruction decode means for processing by the integer pipeline and when the mode register means indicates that the second instruction set is processed.

7. The processor of claim 6 wherein the first and second instruction sets have independent encoding of instructions to opcodes.

8. The processor of claim 6 wherein the first instruction set is a RISC instruction set and wherein the second instruction set is a CISC instruction set, the CISC instruction set including floating point load-operate instructions but the RISC instruction set not including load-operate instructions.

9. The processor of claim 8 wherein the first instruction set is the PowerPC™ instruction set and wherein the second instruction set is the x86 instruction set.

10. The processor of claim 6 wherein the operand in the floating point format comprises a mantissa portion and an exponent portion.

11. The processor of claim 10 further comprising:

general-purpose registers (GPR) for storing operands and results in the integer format, the GPR supplying integer operands to the integer pipeline; and floating point registers for storing operands and results in the floating point format, the floating point registers supplying floating point operands to the floating point pipeline;

and wherein the memory-operand fetch stage in the integer pipeline comprises means for writing a floating point memory operand to the floating point registers, whereby the memory-operand fetch stage in the integer pipeline retrieves the floating point memory operand from the memory and stores the floating point memory operand to the floating point registers.

12. A processor for processing instructions from a first instruction set and from a second instruction set, the processor comprising:

integer processing means for processing integer instructions from the first instruction set and for processing integer instructions from the second instruction set, the integer processing means comprising:

decode stage means for decoding integer and floating point instructions from the first instruction set and from the second instruction set; and memory-operand fetch stage means for retrieving an operand from a memory, the operand being in an integer format or a floating point format;

floating point processing means for processing floating point instructions from the first instruction set and for processing floating point instructions from the second instruction set; and re-alignment means for coupling the integer processing means to the floating point processing means, comprising:

first means for coupling the decode stage means of the integer processing means to a beginning of the floating point processing means when a first instruction in the first instruction set is processed by the floating point processing means; and second means for coupling the memory-operand fetch stage of the integer processing means to the beginning of the floating point processing means when a second instruction in the second instruction set is processed by the floating point processing means;

wherein the floating point processing means is re-aligned to the integer processing means when the second instruction in the second instruction set is processed by the floating point processing means.

13. The processor of claim 12 wherein the integer processing means comprises a pipeline with a plurality of pipeline stages including the decode stage means and the memory-operand fetch stage means.

14. The processor of claim 12 wherein the floating point processing means comprises a pipeline with a plurality of pipeline stages.

* * * * *